United States Patent [19]

Mori et al.

[11] Patent Number: 4,661,695

[45] Date of Patent: Apr. 28, 1987

[54] OPTICAL APPARATUS AND METHOD FOR DETECTING THE TOP DEAD CENTER POSITION OF AN ENGINE PISTON

[75] Inventors: Satoshi Mori, Nagoya; Tsuneyuki Egami, Nukata; Kouichi Mori, Okazaki; Hidetaka Nohira; Kunimasa Yoshimura, both of Mishima, all of Japan

[73] Assignees: Nippon Soken, Inc., Nishio; Toyota Jidosha Kabushiki Kaisha, Toyota, both of Japan

[21] Appl. No.: 708,813

[22] Filed: Mar. 5, 1985

[30] Foreign Application Priority Data

Mar. 5, 1984 [JP] Japan .................................. 59-42396

[51] Int. Cl.$^4$ .............................................. H01J 5/16
[52] U.S. Cl. ................................... 250/227; 73/119 R
[58] Field of Search ................... 250/227; 350/96.1; 73/118, 119 R, 658

[56] References Cited

U.S. PATENT DOCUMENTS

| | | | |
|---|---|---|---|
| 4,162,399 | 7/1979 | Hudson | 250/227 |
| 4,377,086 | 3/1983 | Linder et al. | 250/227 |
| 4,397,183 | 8/1983 | Ballou et al. | 250/227 |
| 4,397,283 | 8/1983 | Komaroff et al. | 350/96.1 |
| 4,468,956 | 9/1984 | Merlo | 73/119 R |
| 4,527,054 | 7/1985 | White | 250/227 |

OTHER PUBLICATIONS

Technical Paper Series 820053—Dynamic Diesel Engine Timing with Microwaves—The General Motors Approach-Krage, (2/82; Mark K. Krage).

Primary Examiner—David C. Nelms
Assistant Examiner—William L. Oen
Attorney, Agent, or Firm—Cushman, Darby & Cushman

[57] ABSTRACT

A position detector for detecting the piston TDC position in a piston engine has a cylindrical casing penetrating the top wall defining a combustion chamber of the engine and fixed thereto, a light emission element, a light reception element each being accommodated within the upper half of the casing, an inlet optical fiber connected to the light emission element and an outlet optical fiber connected to the light reception element. These optical fibers are inserted into the lower half of the casing. The lower end of each optical fiber is opposed to the upper surface of the piston at a predetermined distance therefrom when the piston is located in the vicinity of the TDC position. The light emitted by the light emission element is applied to the upper surface of the piston, after passing the inlet optical fiber. The reflected light from the upper surface of the piston is received and sent to the light reception element by the outlet optical fiber. The light reception element transmits a light reception signal corresponding to the amount of the received light to the detecting circuit. The detecting circuit detects peaks of the light reception signal, which appear before and after the piston TDC position, calculates the half of the rotating angle of a crankshaft between two adjacent peaks and transmits a TDC piston detecting signal when the crankshaft rotates by the calculated rotating angle from the time the preceding peak out of two adjacent peaks appearing in the following period is detected.

11 Claims, 9 Drawing Figures

F I G. 4
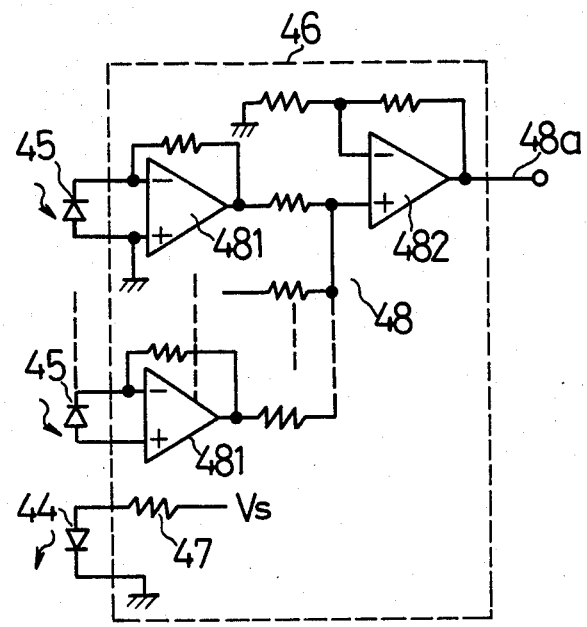
F I G. 5
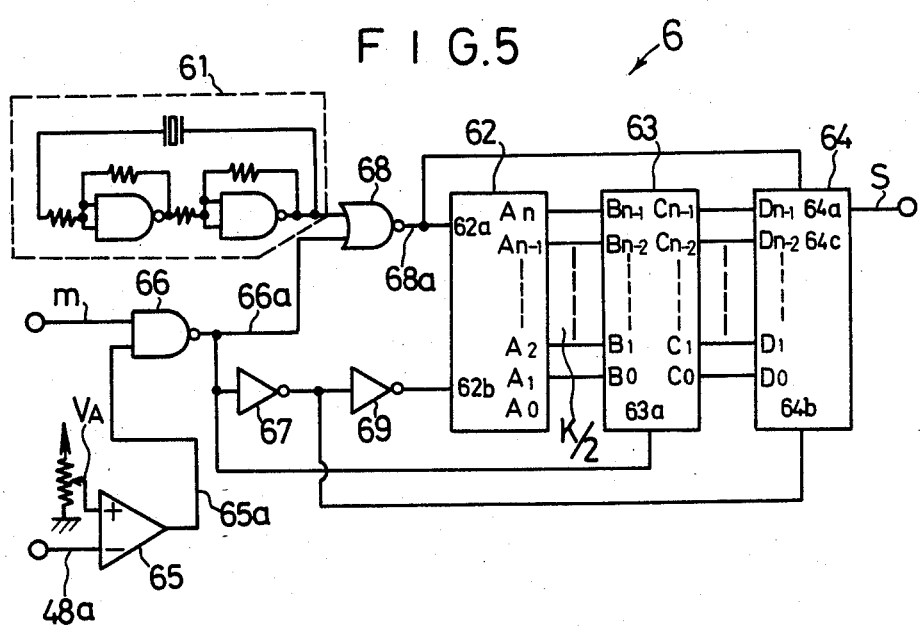

OPTICAL APPARATUS AND METHOD FOR DETECTING THE TOP DEAD CENTER POSITION OF AN ENGINE PISTON

BACKGROUND OF THE INVENTION

The present invention relates to a TDC (top dead center) position detector of an engine.

In order to effectively operate a piston engine, the spark and fuel injection timing thereof must be set at the optimum piston position. The optimum piston position is usually determined based on the TDC position of the piston. Therefore, the TDC position must be accurately detected.

Conventionally, the TDC position has been detected by measuring the rotating angle of a crankshaft or the like connected to the piston. However, this detecting method has a problem that the undesirable unfitness occurring between the crankshaft and the connecting rod or between the connecting rod and the piston pin results in errors in detection.

Under the above circumstances, it has been proposed to detect the TDC position directly by using microwaves. According to this method, a microwave antenna is disposed within a combustion chamber of an engine, which acts as a microwave resonance cavity.

In this case, the TDC position can be detected by measuring the amplitude of the reflected microwaves varying with the reciprocation of the piston.

This microwave type detector is superior in that the TDC position can be accurately detected, but has a problem that the cost thereof is high.

SUMMARY OF THE INVENTION

One object of the present invention is to provide a detector which directly detects the piston TDC position of an engine with accuracy.

Another object of the present invention is to provide a detector having a simple structure, which is produced at a low cost.

Still another object of the present invention is to provide a detector which accurately detects the TDC position, using light.

The TDC position detector of an engine comprises a light emission element, a light reception element which transmits a light reception signal corresponding to the amount of the received light, a light inlet path for guiding light emitted by the light emission element into a combustion chamber of the engine, a light outlet path for guiding light reflected from the upper surface of the piston out of the combustion chamber, and a detecting means for detecting the TDC position of the piston from the variation of the light reception signal transmitted by the light reception element in accordance with the position of the reciprocating piston, and transmitting a TDC position detecting signal.

One end of the light inlet path is connected to the light emission element while the other end of the light inlet path is located within the combustion chamber so as to be opposed to the upper surface of the piston at a predetermined distance therefrom when the piston ascends in the vicinity of the TDC position.

One end of the light outlet path is connected to the light reception element while the other end of the light outlet path is located close to the other end of the light inlet path.

The detecting means is electrically connected to the light reception element.

BRIEF DESCRIPTION OF THE DRAWINGS

FIG. 4 is a circuit diagram of a pre-processing circuit;

FIG. 5 is a circuit diagram of a detecting circuit;

DETAILED DESCRIPTION OF THE INVENTION

Figure 1:
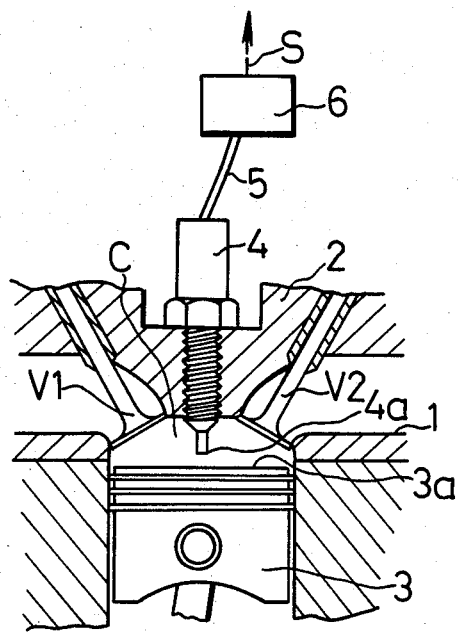
FIG. 1 is a sectional view of the upper portion of a cylinder of a piston engine provided with a TDC position detector of the present invention.

FIG. 1 illustrates the upper portion of a cylinder of a piston engine.

In FIG. 1, on a cylinder block 1 is disposed a cylinder head 2. A combustion chamber C is formed above a piston 3 reciprocating within the cylinder. The reference characters V1 and V2 designate an intake valve and an exhaust valve, respectively.

The cylinder head 2 is provided with a TDC position detector 4 penetrating therethrough. The lower half of the detector 4 is screwed to the cylinder head 2. A lower end 4a of the detector 4 projects into the combustion chamber C and is opposed to the upper surface 3a of the piston 3 at the position close thereto when the piston 3 ascends to the vicinity of the TDC position.

The detector 4 is connected to a detecting circuit 6 by means of a lead wire 5. The detecting circuit 6 transmits a TDC position detecting signal S.

Figure 2:
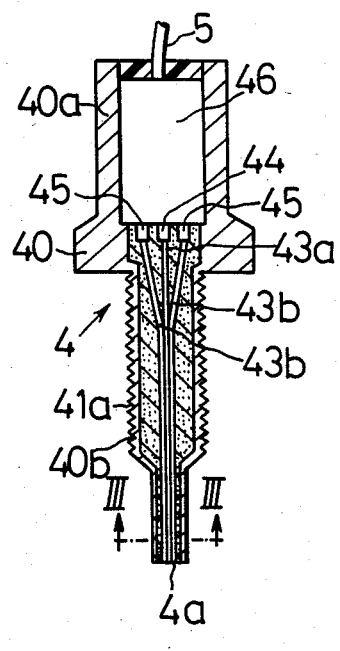
FIG. 2 is a sectional view of the TDC position detector.

FIG. 2 illustrates the structure of the position detector 4. A casing 40 has a cylindrical shape and is composed of an upper half portion 40a and a lower half portion 40b, each having different diameters. The outer peripheral portion of the lower half portion 40b is provided with a screw portion 41a. The lower end of the upper half portion 40a has a hexagonal cross section to be turned when the detector 4 is secured to the cylinder head 2.

Ceramic filler is charged within the lower half portion 40b and bundle-shaped optical fibers 43a and 43b are embedded in the axial center thereof. Each optical fiber 43a or 43b extends to the lower end 4a of the detector 4.

Figure 3:
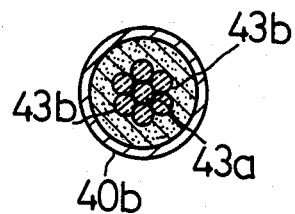
FIG. 3 is a sectional view taken along the line III—III of FIG. 2.

As shown in FIG. 3, a plurality of fibers 43b is arranged round a single fiber 43a. The upper end of the fiber 43a acting as a light inlet path is connected to a light emission element 44 such as a light emission diode provided within the upper half portion 40a.

The upper end of each fiber 43b acting as a light outlet path is connected to a light reception element 45 such as a photo diode. The light emission element 44 and the light reception elements 45 are secured to a printed circuit board 46. The light emission element 44 is connected to a power source $V_s$ through a currentlimiting resistor 47 (shown in FIG. 4) provided on the board 46 while the light reception elements 45 are connected to a pre-processing circuit 48.

The pre-processing circuit 48 comprises a plurality of current-voltage converting circuits 481, each being provided for one light reception element 45, and an adding circuit 482 which adds output signals of the converting circuits 481 and transmits a light reception signal 48a.

The light reception signal 48a is inputted to the detecting circuit 6 by way of the lead wire 5 shown in FIG. 1.

FIG. 5 illustrates the detecting circuit 6. The detecting circuit 6 is composed of an oscillation circuit 61, a binary counter 62, a latch 63, a down counter 64, a comparator 65 and gates 66, 67, 68 and 69.

Output terminals $A_1, A_2 \ldots A_n$ of the binary counter 62 are connected to input terminals $B_0, B_1 \ldots B_{n-1}$ of the latch 63, respectively.

Output terminals $C_0, C_1 \ldots C_{n-1}$ of the latch 63 are connected to input terminals $D_0, D_1 \ldots D_{n-1}$ of the down counter 64, respectively. In this circuit, the LSB (least significant bit) output terminal $A_0$ of the binary counter 62 is not used.

The light reception signal 48a is inputted to the inverting input terminal of the comparator 65. A mask signal m transmitted by a crank angle detector (not shown) provided in a crankshaft (not shown) is inputted to the AND gate 66. The mask signal m is turned to 1 state only when the piston 3 is located in the vicinity of the TDC position.

Hereinafter, the operation of the detector 4 will be explained.

The light emitted by the light emission element 44 is applied to the upper surface 3a of the piston 3, passing the optical fiber 43a. The applied light is reflected from the upper surface 3a of the piston 3.

The reflected light is received by the optical fibers 43b and led to the light reception elements 45. The amount of light received by the light reception elements 45 varies with the distance L between the lower end 4a of the detector 4 and the upper surface 3a of the piston 3.

Figure 6:
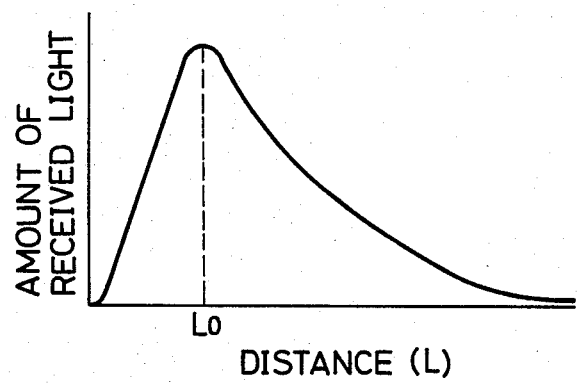
FIG. 6 is a view illustrating the variation in the amount of received light in accordance with the variation in the distance between the upper surface of a piston and the top end of the TDC position detector.

FIG. 6 illustrates the variation in the amount of received light of the light reception elements 45.

The amount of received light becomes maximum at the predetermined distance $L_0$. As the distance becomes shorter than $L_0$, the amount of received light is decreased. This results from the fact that the incidence angle of the reflected light incident on the optical fibers 43b increases so at a distance shorter than $L_0$ the reflected light cannot be transmitted through the fibers 43b.

Therefore, it is preferable to install the detector 4 so that the above distance is smaller than the distance $L_0$ when the piston 3 ascends to the TDC position.

Figure 7:
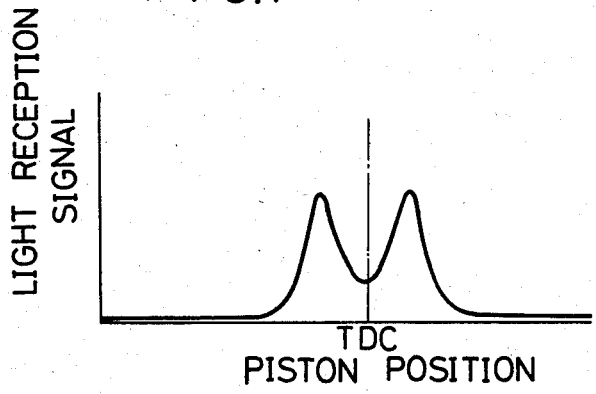
FIG. 7 is a wave-form chart of a light reception signal produced in one rotation of the crankshaft of an engine.

FIG. 7 illustrates the variation of the light reception signal 48a with the rotation of the crankshaft when the position detector 4 is located at the above described position. The signal 48a has peaks before and after the TDC position of the piston and is symmetric with respect to the TDC position. Therefore, the TDC position can be obtained from the intermediate point between the two peaks.

Figure 8:
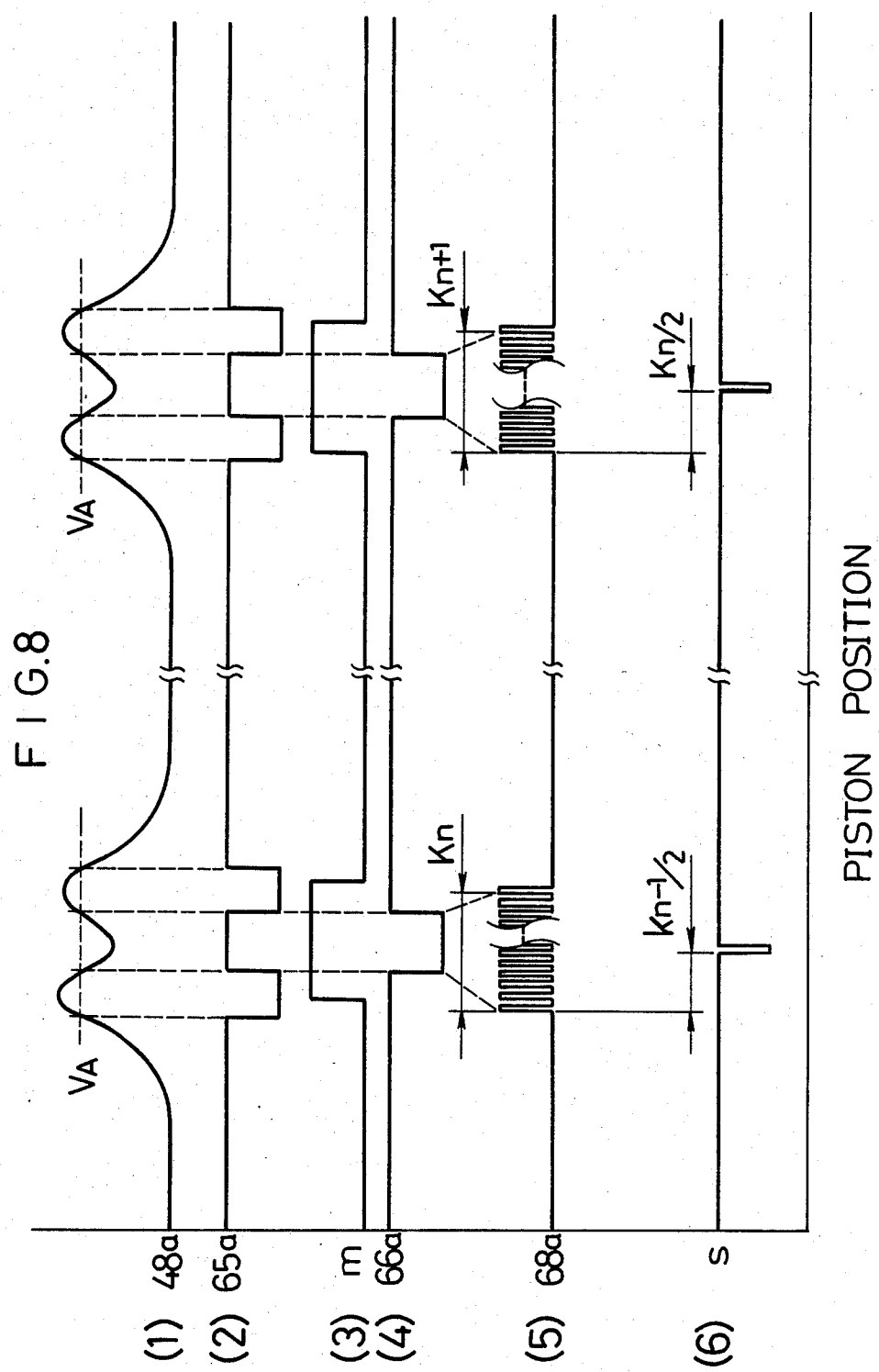
FIG. 8 is a wave-form of various signals varying with the reciprocation of the piston.

The light reception signal 48a shown in FIG. 8(1) is inputted to the comparator 65 and is compared with the constant voltage $V_A$ to output a signal 65a shown in FIG. 8(2), which is turned to 0 state upon receiving the peaked values of the signal 48a. The signal 65a is masked by the mask signal m shown in FIG. 8(3) into a signal 66a of 0 state shown in FIG. 8(4). Only when the signal 66a is outputted, the clock pulse 68a shown in FIG. 8(5) of the oscillation circuit 61 is inputted to the input terminal 62a of the counter 62. The counter 62 counts the signal 68a and transmits the count data K. To the latch 63 is transmitted the data K/2 which is one half of the count data K when the signal 66a inputted to the clock terminal 63a rises. Immediately after that, the counter 62 is reset by the signal 66a inputted to the reset terminal 62b.

The data K/2 is transmitted to the down counter 64 when the signal 66a inputted to the preset terminal 64b drops. The data K/2 preset in the counter 64 is counted down by the pulse 68a inputted to the clock input terminal 64a.

The counter 64 transmits TDC detecting signal S(FIG. 8(6)) from the output terminal 64c at the end of the counting down operation thereof.

The obtained signal S is outputted at the timing corresponding to that when the piston reaches the TDC position.

In practice, the signal S is outputted at the timing delayed from the actual timing by one period as shown in FIG. 8 ($K_n$ denotes the count data of the n period). This delay does not incur any practical problem since the TDC position does not abruptly change.

In the above embodiment, the optical fiber 43a is used for guiding light to the upper surface of the piston while the optical fibers 43b are used for receiving reflected light from the piston. Instead, the function of the optical fiber 43a can be exchanged for that of the optical fibers 43b.

Figure 9:
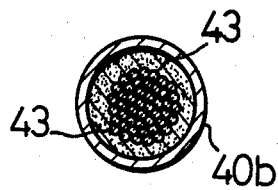
FIG. 9 is a sectional view illutrating another embodiment of the detector according to the present invention.

FIG. 9 illustrates another embodiment of the present invention.

In this embodiment, a large number of fine optical fibers 43 are disposed within the lower half portion 40b of the casing 40. The fibers 43 located in the central portion of the casing 40 act as the light emission fibers while the fibers 43 located in the peripheral portion of the casing 40 act as the light reception fibers, for example.

The bundle of a large number of fine optical fibers has flexibility so as to be conveniently used in the detector 4 of which the printed circuit board 46 (FIG. 2) is provided separately from the main body thereof.

One light emission element 44 or one light reception element 45 is not necessarily required to be provided for every one optical fiber. A plurality of fibers can be connected to one element 44 or 45.

Furthermore, by employing pulse outputted every time the crankshaft rotates by a predetermined crank angle in place of the pulse outputted by the clock pulse 68a, the accurate TDC position can be detected regardless of any variation in the speed of the piston 3 occurring in the vicinity of the TDC position.

When the piston detector is likely to be affected by the combustion light within the combustion chamber C, an optical filter may be provided in the light reception element 45 for cutting off the combustion light.

What is claimed is:

1. A TDC (top dead center) position detector of an engine, comprising:
   a casing adapted to penetrate a top wall defining a combustion chamber of the engine, and to be fixed thereto;

a light emission element accommodated within said casing;

light reception means accommodated within said casing, for transmitting a light reception signal corresponding to an amount of received light;

light inlet means for guiding light emitted by said light emission element into the combustion chamber of the engine; one end of said light inlet means being connected to said light emission element, and the other end of said light inlet means adapted to be located within the combustion chamber; said other end of said light inlet means being adapted to be opposed to an upper surface of a piston within said combustion chamber at a predetermined distance therefrom when the piston ascends in the vicinity of a TDC position;

light outlet means for guiding light reflected by the upper surface of the piston out of the combustion chamber; one end of said light outlet means being connected to said light reception means while the other end of said light outlet means being located close to said other end of said light inlet means;

said light inlet means and said light outlet means being composed of optical fibers; said optical fibers being shaped into a bundle and inserted into said casing, at least one optical fiber extending in the axial center of said bundle and acting as one of said light inlet means and said light outlet means and at least three optical fibers extending around said at least one optical fiber at equal intervals in the circumferential direction and acting as the other one of said light inlet means and said light outlet means; and detecting means for detecting the TDC position of the piston from the variation of the light reception signal transmitted by said light reception means in accordance with the position of the reciprocating piston and transmitting a TDC position detecting signal, said detecting means being connected to said light reception means.

2. A TDC position detector according to claim 1, wherein said optical fibers acting as said light inlet means are connected to a single light emission element while said optical fibers acting as said light outlet path are connected to a single light reception element.

3. A TDC position detector according to claim 1, wherein said detecting means comprises means for detecting the time when said light reception signal crosses a predetermined threshold level before and after the TDC position of the piston, means for calculating the travelling amount of the piston from the time when said light reception signal crosses said predetermined threshold level before the TDC position of the piston to the time when said light reception signal crosses said predetermined threshold level after the TDC position of the piston, and means for transmitting the TDC position detecting signal when the piston travels by one half of the calculated travelling amount from the time when said light reception signal crosses said predetermined threshold level before the TDC position of the piston.

4. A TDC position detector according to claim 3, wherein said means for calculating the travelling amount of the piston calculates the travelling amount from the rotating angle of a crankshaft of the engine from the time when said light reception signal crosses said predetermined threshold level before the TDC position of the piston to the time when said light reception signal crosses said predetermined threshold level after the TDC position of the piston.

5. A TDC position detector according to claim 4, wherein said means for detecting a time when said light reception signal crosses a predetermined threshold level before and after the TDC position of the piston comprises gate means for opening during a period from the time when said light reception signal crosses said predetermined threshold level before the TDC position of the piston and ending at a time when said light reception signal crosses said predetermined threshold level after the TDC position of the piston, and for passing count pulses outputted at every predetermined rotating angle of the crankshaft, wherein said means for calculating the travelling amount of the piston comprises counter means for counting the count pulses passed by said gate, and wherein said means for transmitting the TDC position detecting signal comprises down counter means for counting down a down count value equal to half of the count value of said counter means, which is preset when said light reception signal crosses said predetermined threshold level before the TDC position of the piston in the following period of the light reception signal, upon receiving the count pulse and transmitting the position detecting signal at the end of the counting down operation.

6. A TDC position detector according to claim 3, wherein said means for calculating the travelling amount of the piston calculates the travelling amount based on a time period from the time said light reception signal crosses said predetermined threshold level before the TDC position of the piston to the time when said light reception signal crosses said predetermined threshold level after the TDC position of the piston.

7. A TDC position detector according to claim 6, wherein said means for detecting the time when said light reception signal crosses a predetermined threshold level before and after the TDC position of the piston comprises gate means for opening from the time when said light reception signal crosses said predetermined threshold level before the TDC position of the piston to the time when said light reception signal crosses said predetermined threshold level after the TDC position of the piston and for passing clock pulses appearing at every predetermined time, said means for calculating the travelling amount of the piston comprises a counter counting the clock pulses and said means for transmitting the TDC position detecting signal comprises a down counter counting down the half of the count value of said counter, which is preset when said light reception signal crosses said predetermined threshold level before the TDC position of the piston in the following period of the light reception signal, upon receiving the count pulses, and transmitting the position detecting signal at the end of the counting down operation.

8. A TDC position detector according to claim 1, wherein said at least three optical fibers extending around said at least one optical fiber act as said light output means and are connected to at least three light reception means, respectively, and said detecting means comprises adding means for adding at least three light reception signals transmitted by said at least three light reception elements.

9. A TDC (top dead center) position detector of an engine, comprising:

a cylindrical casing penetrating a top wall defining a combustion chamber of the engine and fixed thereto;

a light emission element accommodated within said casing;

light reception means, accommodated within said casing, for receiving reflected light and transmitting a light reception signal corresponding to an amount of said reflected light;

light inlet means for guiding light emitted by said light emission element into a cumbustion chamber of the engine, one end of said light inlet means being connected to said light emission element while the other end of said light inlet means being located within the combustion chamber, said other end of said light inlet means being located to be opposed to an upper surface of a piston in the combustion chamber at a predetermined distance therefrom when the piston ascends in the vicinity of a TDC position;

light outlet means for guiding light reflected by the upper surface of the piston out of the combustion chamber; one end of said light outlet means being connected to said light reception means while the other end of said light outlet means being located close to said other end of said light inlet means; and detecting means for detecting the TDC position of the piston from the variation of the light reception signal transmitted by said light reception means in accordance with the position of the reciprocating piston, and for transmitting a TDC position detecting signal indicative of said TDC position, said detecting means being connected to said light reception means, said detecting means comprising: (a) means for detecting a time when said light reception signal crosses a predetermined threshold level before and after the TDC position of the piston; (b) means for calculating a travelling amount of the piston from the time when said light reception signal crosses said predetermined threshold level before the TDC position of the piston to the time when said light reception signal crosses said predetermined threshold level after the TDC position of the piston; and (c) means for transmitting the TDC position detecting signal when the piston travels by substantially one half of the calculated travelling amount from the time when said light reception crosses said predetermined threshold level before the TDC position of the piston.

10. An apparatus for detecting a top dead center position of a cylinder in an engine, comprising:

means for emitting a light towards said cylinder;

means for detecting a reflection of said light which is reflected by said cylinder, and converting said reflected light into a signal indicative thereof; and control means for:

(1) detecting, during a first engine cycle, a first top dead center interval period, during which said cylinder is sufficiently close to said light receiving means so that an angle of incidence upon said light receiving means causes light intensity detected thereby to be diminished;

(2) detecting a time to a midpoint of said first top dead center interval period;

(3) detecting, during a second engine cycle, a beginning of a second top dead center interval; and (4) counting a time equivalent to said time to a midpoint of said first top dead center interval, from the beginning of said second top dead center interval, at the end of which a top dead center condition is determined.

11. A method for detecting top dead center of a cylinder in an engine, comprising the steps of:

shining a light onto said cylinder;

detecting a reflection of said light shined onto said cylinder;

detecting a first top dead center interval during a first engine cycle, said first top dead center interval including a period during which an intensity of detected light diminishes due to a large angle of incidence of reflected light detected during said detecting step;

determining a midpoint time as a time to a midpoint of said first top dead center interval after a termination of said first engine cycle;

detecting a beginning of a second top dead center interval during a second engine cycle; and counting a time equivalent to said midpoint time after the beginning of said second top dead center interval, at the end of which counting a top dead center condition is detected.

* * * * *